(12) United States Patent
Lestreus (10) Patent No.: US 8,068,809 B2
(45) Date of Patent: Nov. 29, 2011

(54) COMMUNICATION REWARD

(75) Inventor: Elizabeth Marie Lestreus, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 478 days.

(21) Appl. No.: 12/397,636

(22) Filed: Mar. 4, 2009

(65) Prior Publication Data

US 2010/0227649 A1 Sep. 9, 2010

(51) Int. Cl.
*H04M 11/00* (2006.01)
(52) U.S. Cl. .......................... 455/405; 455/418; 455/461
(58) Field of Classification Search .................. None
See application file for complete search history.

(56) References Cited

U.S. PATENT DOCUMENTS

2006/0089874 A1* 4/2006 Newman et al. ............... 705/14
2008/0221925 A1* 9/2008 Jones .............................. 705/2

* cited by examiner

*Primary Examiner* — Anh Tran
(74) *Attorney, Agent, or Firm* — Snyder, Clark, Lesch & Chung, LLP (57) ABSTRACT

A method is performed by a device that includes a display and a communication application. The method includes identifying a reward criterion for communication activities using the communication application, receiving an indication of a communication activity, and recording the indication of the communication activity with a cumulative total of communication activities. The method also includes presenting, on the display, a graphic representation of the cumulative total of communication activities, where the cumulative total of communication activities is presented in relation to the reward criterion.

20 Claims, 6 Drawing Sheets

COMMUNICATION REWARD

BACKGROUND

Mobile devices (e.g., cellular telephones, personal digital assistants, etc.) provide a variety of ways for users of these devices to communicate, such as telephone calls, electronic mail (email), and text messages. Mobile devices may enable a user to keep a list of contacts, some of which are more actively used than others. While a user may intuitively know which contacts are used most frequently, mobile devices typically do not provide an interesting way to visualize a user's communication pattern for multiple contacts.

SUMMARY

According to one implementation, a method may be performed by a device that includes a display and at least one communication application. The method may include identifying, via the user device, a reward criterion for communication activities that use the at least one communication application; receiving, by the user device, an indication of a communication activity; and recording, in the user device, the indication of the communication activity with a cumulative total of communication activities. The method may also include presenting, on the display, a graphic representation of the cumulative total of communication activities, where the cumulative total of communication activities is presented in relation to the reward criterion.

Additionally, the method may include providing a reward to a user if the cumulative total of communication activities meets the reward criterion.

Additionally, the reward may include one of unlocking a feature of the user device, free services from a subscription communications service, access to free multimedia content, or a coupon for third-party vendors.

Additionally, the indication of a communication activity may include a communication activity with a particular contact, and where the cumulative total of communication activities includes a cumulative total of communication activities for the particular contact.

Additionally, the method may include obtaining a threshold criterion for presenting the graphic representation of the cumulative total of communication activities for the particular contact, and determining that the cumulative total of communication activities for the particular contact meets the threshold level.

Additionally, the reward criterion may be based on a particular number of communication activities within a particular time period.

Additionally, the reward criterion may be based on a particular duration of communication activities within a particular time period.

Additionally, the communication activity may include sending or receiving one or more of an email, a text message, a telephone call, or an instant message.

Additionally, the communication activity may include one of communications received by the user device or communications sent from the user device.

According to another implementation, a device may include a communications interface, a display, and a processor. The processor may send and receive communications using the communications interface, obtain indications of the communications, record the indications of the communications based on a contact associated with each of the communications, present, on the display, a graphic representation of a cumulative total of communications associated with the contact, where the cumulative total of communications is presented in relation to a reward criterion.

Additionally, the device may include a memory to store the recorded indications of communications based on a contact associated with each of the communications.

Additionally, the processor may be further configured to provide access to a reward if the cumulative total of communications meets the reward criterion.

Additionally, a reward, associated with the reward criterion, may include unlocking a feature of the device.

Additionally, each of the indications of communications may include a communication with a particular contact and a type of communication application associated with the communication.

Additionally, the graphic representation of the cumulative total of communications associated with the contact may include the types of communications associated with the contact.

Additionally, the processor may be further configured to determine that the cumulative total of communications associated with the contact meets a threshold criterion for presenting communications associated with the contact on the graphic representation.

Additionally, the reward criterion may be based on one of a particular number of communication activities within a particular time period, or a particular duration of communication activities within a particular time period.

Additionally, the communications may include sending or receiving one or more of email, text messages, telephone calls, or instant messages.

According to yet another implementation, a method may be performed by a device that includes a display and a plurality of communication applications. The method may include identifying, via the user device, a reward criterion for conducting communications using the plurality of communication applications and recording, in the user device, indications of communications, where each of the indications includes one of a group of particular contacts associated with a communication and a type of communication application associated with the communication. The method may also include identifying, via the user device, a threshold criterion for presenting, on the display, a graphic representation of a cumulative total of communications associated with one of the particular contacts; and presenting, on the display, the graphic representation of the cumulative total of communications associated with the one of the particular contacts, where the cumulative total of communications is presented in relation to the reward criterion.

Additionally, the method may include providing a reward to the user of the user device if the cumulative total of communications meets the reward criterion.

BRIEF DESCRIPTION OF THE DRAWINGS

The accompanying drawings, which are incorporated in and constitute a part of this specification, illustrate one or more systems and/or methods described herein and, together with the description, explain these systems and/or methods. In the drawings.

DETAILED DESCRIPTION

The following detailed description refers to the accompanying drawings. The same reference numbers in different drawings may identify the same or similar elements. Also, the following detailed description does not limit the invention.

Overview

Systems and/or methods described herein may provide a user with an easy way to visualize communication patterns with contacts. The communication patterns may be represented in the form of a game, where the user can influence the game results by communicating more (or less). Indications of communication activity may be graphically presented by showing representations of particular contacts approaching a goal or target that signifies a reward.

Figure 1:
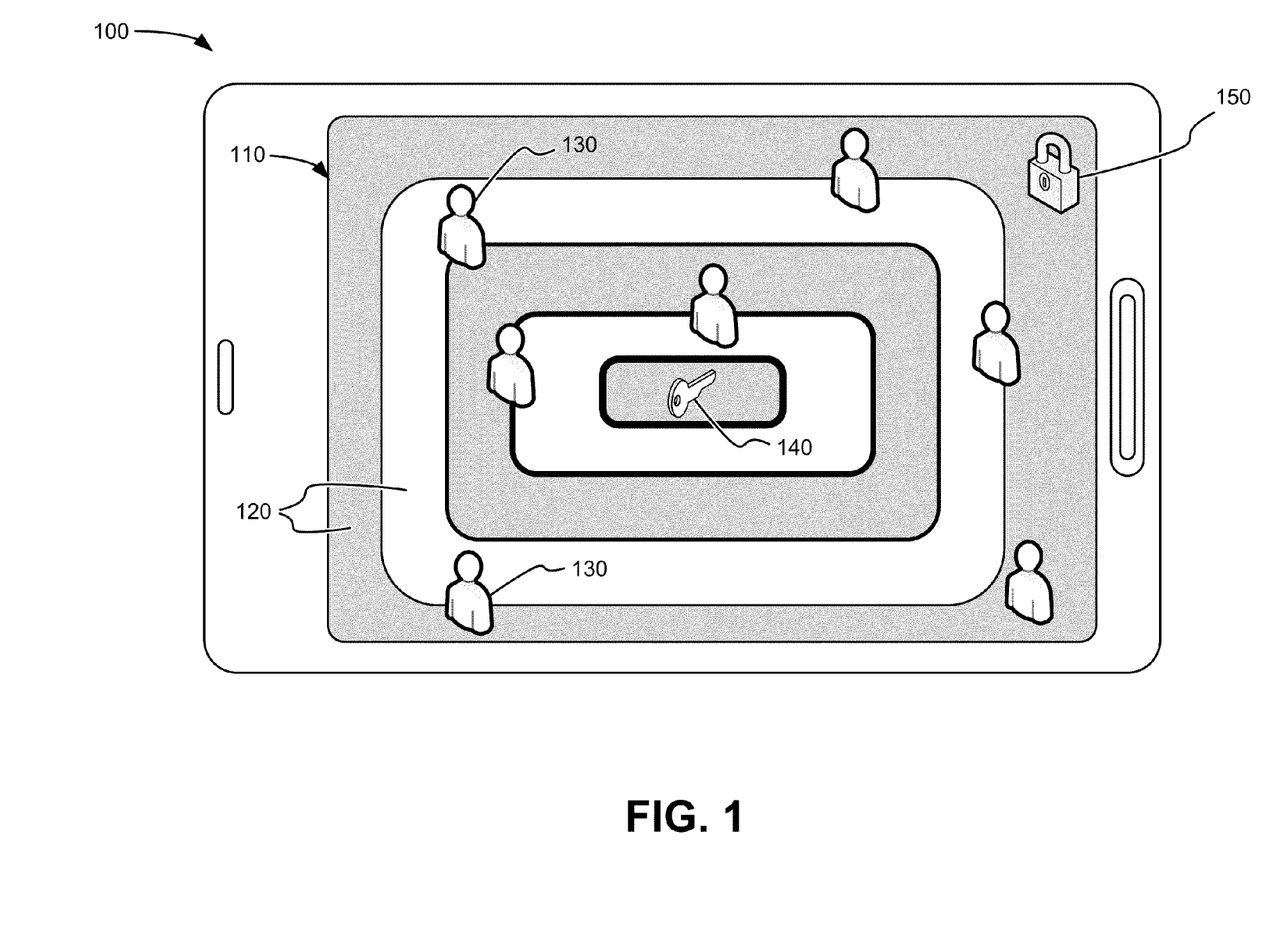
FIG. 1 is a schematic illustrating an exemplary implementation of concepts described herein.

FIG. 1 provides a schematic illustrating an exemplary implementation of concepts described herein. Referring to FIG. 1, a user device 100 may display a contact activity pattern screen 110. User device 100 may track communications (e.g., emails, text messages, and/or phone calls) sent from and/or received by user device 100. Contact activity pattern screen 110 may be divided into zones 120 that may be used to indicate communication frequency with particular contacts. Contact identifiers 130 may be used to represent the location of particular contacts within a zone. Contact identifiers 130 may be represented as graphic images and/or text. For example, contact identifiers 130 may include pictures, icons, names, and/or other information associated with a contact.

Once a certain threshold level of communications have occurred with a particular contact (e.g., twenty emails/phone calls or fifty text messages within a week), a contact identifier 130 representing the particular contact may appear on contact activity pattern screen 110. As communications continue with the particular contact, the contact identifier 130 associated with the particular contact may progress from the outermost zone of contact activity pattern screen 110 toward a target 140 in a center zone. Target 140 may represent a communications objective (e.g., fifty emails/phone calls or two-hundred text messages within a month) that generates a reward, such as unlocking a new feature of user device 100. A new feature indicator 150 may be shown to signify to a user when a reward is available.

A "user device," as the term is used herein, is intended to be broadly interpreted to include a mobile communication device (e.g., a radiotelephone, a personal communications system terminal that may combine a cellular radiotelephone with other communications capabilities, a personal digital assistant that can include a radiotelephone and/or Internet/intranet access, etc.); a laptop computer; a personal computer; a pager; a gaming device; and/or any other device capable of facilitating communications over a network. The term "user," as used herein, is intended to be broadly interpreted to include a user device or a user of a user device.

A "communication," as used herein, may be broadly interpreted to include any form of communication supported by a user device. For example, a communication may include a telephone call, an email, an instant message, a short message service (SMS) message, a multimedia messaging service (MMS) message, etc. A "communication activity," as used herein, may be broadly interpreted as sending or receiving a communication from a user device.

Exemplary User Device Configuration

Figure 2:
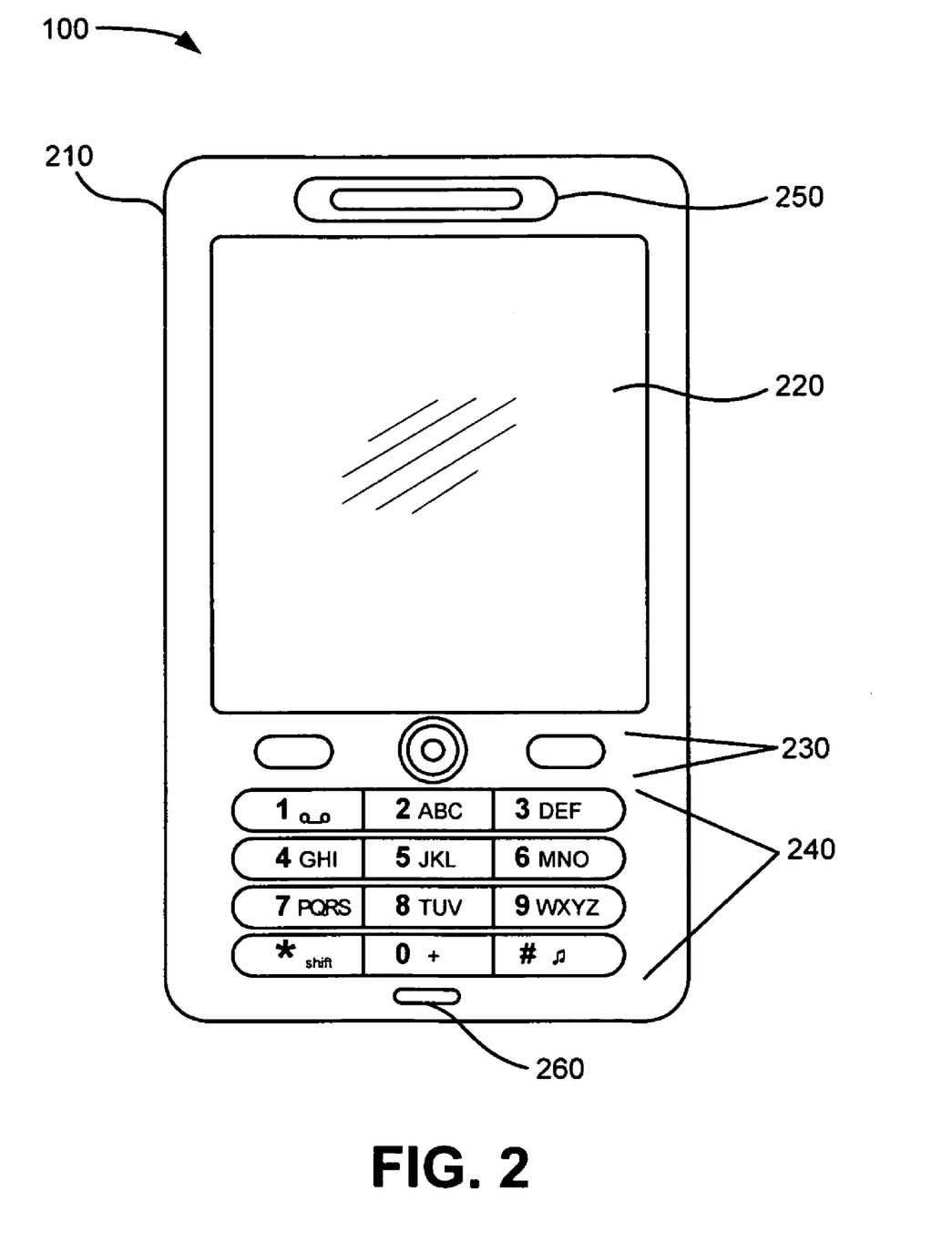
FIG. 2 depicts an exemplary diagram of a user device in which systems and/or methods described herein may be implemented.

FIG. 2 depicts an exemplary diagram of user device 100. As illustrated, user device 100 may include a housing 210, a display 220, control buttons 230, a keypad 240, a speaker 250, and/or a microphone 260.

Housing 210 may protect the components of user device 100 from outside elements. Housing 210 may include a structure configured to hold devices and components used in user device 100, and may be formed from a variety of materials. For example, housing 210 may be formed from plastic, metal, or a composite, and may be configured to support display 220, control buttons 230, keypad 240, speaker 250, and/or microphone 260.

Display 220 may include a device that can display signals generated by user device 100 as text or images on a screen (e.g., a liquid crystal display (LCD), cathode ray tube (CRT) display, organic light-emitting diode (OLED) display, surface-conduction electro-emitter display (SED), plasma display, field emission display (FED), bistable display, etc.). In certain implementations, display 220 may provide a high-resolution, active-matrix presentation suitable for the wide variety of applications and features associated with user devices.

Display 220 may provide visual information to the user. For example, display 220 may provide information and menu controls regarding incoming or outgoing telephone calls and/or incoming or outgoing email, instant messages, SMS messages, etc. Display 220 may further display information and controls regarding various applications executed by user device 100, such as a web browser, a phone book/contact list program, a calendar, an organizer application, image manipulation applications, navigation/mapping applications, an MP3 player, as well as other applications. For example, display 220 may present information and images associated with application menus that can be selected using multiple types of input commands.

In some implementations, a touch panel (not shown) may be integrated with and/or overlaid on display 220 to form a touch screen or a panel-enabled display that may function as a user input interface. Exemplary touch panel technology may include near field-sensitive (e.g., capacitive) technology, acoustically-sensitive (e.g., surface acoustic wave) technology, photo-sensitive (e.g., infra-red) technology, pressure-sensitive (e.g., resistive) technology, force-detection technology and/or any other type of touch panel overlay that allows display 220 to be used as an input device.

Control buttons 230 may permit the user to interact with user device 100 to cause user device 100 to perform one or more operations. For example, control buttons 230 may be used to cause user device 100 to activate a contact activity pattern screen (such as contact activity pattern screen 110 of FIG. 1) or to transmit and/or receive communications (e.g., to display a text message via display 220, initiate a phone call to a selected contact, etc.).

Keypad 240 may also provide input to user device 100. Keypad 240 may include a standard telephone keypad. Keys on keypad 240 may perform multiple functions depending upon a particular application selected by the user. In one implementation, each key of keypad 240 may be, for example, a pushbutton. A user may utilize keypad 240 for entering information, such as text or a phone number, or activating a special function. Alternatively, keypad 240 may take the form of a keyboard that may facilitate the entry of alphanumeric text.

Speaker 250 may provide audible information to a user of user device 100. Speaker 250 may be located in an upper portion of user device 100, and may function as an ear piece when a user is engaged in a communication session using user device 100. Speaker 250 may also function as an output device for music and/or audio information associated with games and/or video images played on user device 100.

Microphone 260 may receive audible information from the user. Microphone 260 may include a device that converts speech or other acoustic signals into electrical signals for use by user device 100. Microphone 260 may be located proximate to a lower side of user device 100.

Although FIG. 2 shows exemplary components of user device 100, in other implementations, user device 100 may contain fewer, additional, different, or differently arranged components than depicted in FIG. 2. In still other implementations, one or more components of user device 100 may perform one or more other tasks described as being performed by one or more other components of user device 100.

Figure 3:
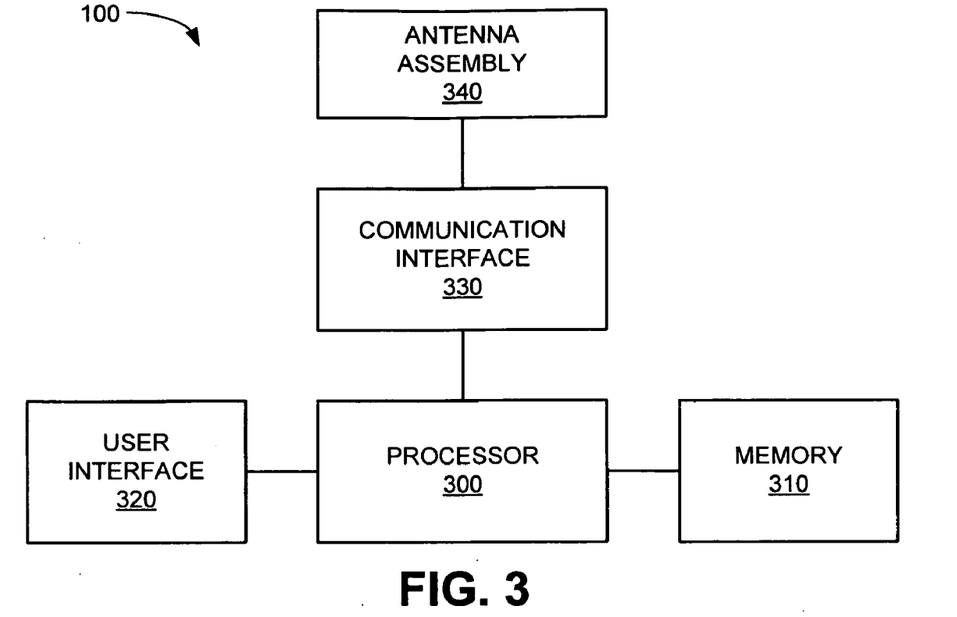
FIG. 3 illustrates a diagram of exemplary components of the user device depicted in FIG. 1.

FIG. 3 illustrates a diagram of exemplary components of user device 100. As illustrated, user device 100 may include a processor 300, a memory 310, a user interface 320, a communication interface 330, and/or an antenna assembly 340.

Processor 300 may include one or more microprocessors, application-specific integrated circuits (ASICs), field-programmable gate array (FPGAs), or the like. Processor 300 may control operation of user device 100 and its components. In one implementation, processor 300 may control operation of components of user device 100 in a manner described herein.

Memory 310 may include a random access memory (RAM), a read-only memory (ROM), and/or another type of memory to store data and instructions that may be used by processor 300. Memory 310 may store a group of contacts for a user and to records of communications sent to and/or received from individual contacts in the group of contacts. Memory 310 may also store instances of communications and graphical representations of communication patterns of user device 100. For example, in one implementation, memory 310 may support the displaying and updating of communications with multiple contacts in a stored contacts list.

User interface 320 may include mechanisms for inputting information to user device 100 and/or for outputting information from user device 100. Examples of input and output mechanisms might include buttons (e.g., control buttons 230, keys of keypad 240, a joystick, etc.) or a touch screen interface (e.g., display 220) to permit data and control commands to be input into user device 100; a speaker (e.g., speaker 250) to receive electrical signals and output audio signals; a microphone (e.g., microphone 260) to receive audio signals and output electrical signals; a display (e.g., display 220) to output visual information (e.g., text input into user device 100); a vibrator to cause user device 100 to vibrate; and/or a camera to capture video and/or images.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

As will be described in detail below, user device 100 may perform certain operations described herein in response to processor 300 executing software instructions of an application contained in a computer-readable medium, such as memory 310. A computer-readable medium may be defined as a physical or logical memory device. A logical memory device may include memory space within a single physical memory device or spread across multiple physical memory devices. The software instructions may be read into memory 310 from another computer-readable medium or from another device via communication interface 330. The software instructions contained in memory 310 may cause processor 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of user device 100, in other implementations, user device 100 may contain fewer, additional, different, or differently arranged components than depicted in FIG. 3. In still other implementations, one or more components of user device 100 may perform one or more other tasks described as being performed by one or more other components of user device 100.

Figure 4:
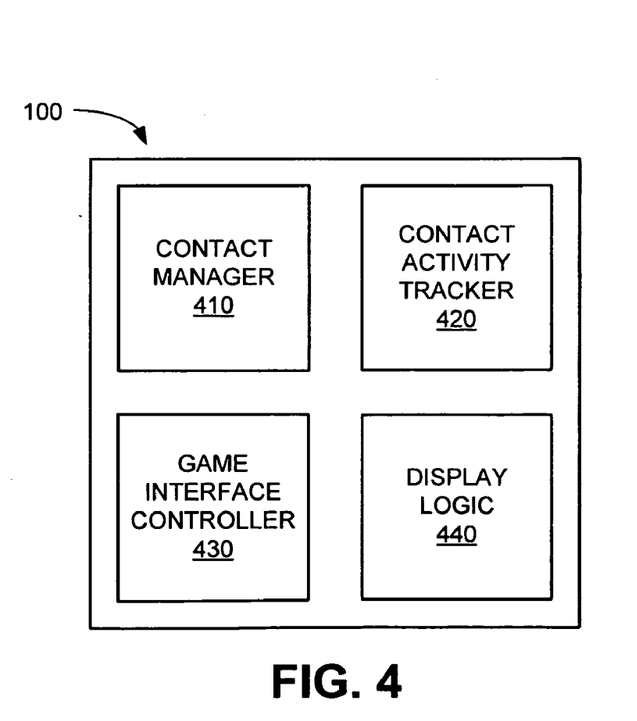
FIG. 4 is functional block diagram of the user device of FIG. 3.

FIG. 4 is a block diagram of exemplary functional components that may be included in user device 100. In one implementation, the functions described in connection with FIG. 4 may be performed by processor 300 (e.g., via execution of instructions contained in memory 310). As shown, user device 100 may include a contact manager 410, a contact activity tracker 420, game interface controller 430, and display logic 440. In other implementations, user device 100 may include fewer, additional, or different types of functional components than those illustrated in FIG. 4.

Contact manager 410 may include hardware or a combination of hardware and software that associates information with particular contacts. For example, a user may assign numbers (such as phone numbers, fax numbers, pager numbers, etc.), addresses (such as email addresses), and images to particular contacts using contact manager 410. Contact manager 410 may store (e.g., in memory 310) the contact information for later use. In one implementation, contact manager 410 may enable the user to start or continue a communication with a contact and may allow the user to see (e.g., by providing command signals to display logic 440) information about the contact. Thus, contact manager 410 may be operatively connected and/or integrated with a variety of communication applications. In other implementations, contact manager 410 may also receive and store (e.g., in memory 310) a user's personal information (e.g., numbers, addresses, images, presence information, etc.) that may be shared with other user devices.

In one implementation, contact manager 410 may receive and/or provide (e.g., to contact activity tracker 420) an indication of communication activity sent from or received by user device 100. Contact manager 410 may also receive and store communication objectives that generate a reward, such as unlocking a new feature of user device 100. Communication objectives may be defined in a format that can be tracked by user device 100, such as a particular number and/or duration of communications. In some implementations, communications objectives may include no limits on time periods to accomplish the communication objective. In other implementations, communication objectives may be defined as a particular number/duration of communication activity within a particular time period (e.g., fifty phone calls within two weeks). In certain implementations, contact manager 410 may receive communications data from contact activity tracker 420 and may determine if a reward is to be made available to the user based on the communications data. In other implementations, contact manager may provide the communication objectives to another component (e.g., contact activity tracker 420) so that the other component can determine if a reward is to be made available to the user.

Contact activity tracker 420 may include hardware or a combination of hardware and software for recording instances of communication activity between a user of user device 100 and one or more contacts. Contact activity tracker 420 may track activity in a variety of communication applications, such as, for example, email, phone, text messaging, and instant messaging applications. In one implementation, contact activity tracker 420 may record instances of sending a communication to and/or receiving a communication from particular contacts. In other implementations, contact activity tracker 420 may record time periods (e.g., phone call durations) of communications to/from contacts. Contact activity tracker 420 may store (e.g., in memory 310) records of communication activity with each contact for particular time periods.

For example, contact activity tracker 420 may store instances of communications activity with particular contacts for a rolling time period (e.g., a one week window) so long as the amount of communications activity does not trigger a threshold level. The threshold level may be, for example, an amount of communications sufficient to trigger the appearance of the contact on contact activity pattern screen 110. Where communication activity with a particular contact surpasses a threshold level within the rolling time period, then communication activity for that contact may be tracked for a different period, such as a period sufficient to achieve the requirements of a communications objective. In other implementations, contact activity tracker 420 may store all instances of communications for a single set time period. In another implementation, contact activity tracker 420 may store instances of communications in a fixed-allotment of memory (e.g., memory 310), such that once the fixed-allotment of memory is full, the oldest records may be overwritten by new entries.

In other implementations, some or all of the features of contact activity tracker 420 may be accomplished by a communications server, such as a communications server provided by a communications services provider. The communications server may facilitate communications to/from user device 100 over a network. The communications server may also track instances of communications and then provide a record of instances of communications to user device 100 for use by, for example, game interface controller 430.

Game interface controller 430 may include hardware or a combination of hardware and software that defines a game screen (e.g., contact activity pattern screen 110) for display on user device 100. Game interface controller 430 may receive communications information (e.g., from contact activity tracker 420) and determine particular images to be displayed based on the communications information. In one implementation, game interface controller 430 may determine sizes and positions of zones 120 and images (such as contact identifiers 130, target 140 and/or new feature indicator 150) to indicate a communications pattern. For example, zone and/or image sizes may vary based on the number of contact identifiers 130 to be displayed and/or based on display 220 size of user device 100. In other implementations, game interface controller 430 may display a communications pattern in other formats that may include graphics (e.g., bar charts, line graphs, scatter plot, etc.) and/or text.

Display logic 440 may include hardware or a combination of hardware and software that alters a display, such as display 220, based on instructions from game interface controller 430. For example, game interface controller 430 may identify the positions of contact identifiers 130, target 140, and/or new feature indicator 150. Upon receiving instructions from a user (e.g., user input to control button 230 or another user input), display logic 440 may be instructed to show the game screen (e.g., contact activity pattern screen 110) on display 220.

Exemplary Process

Figure 5:
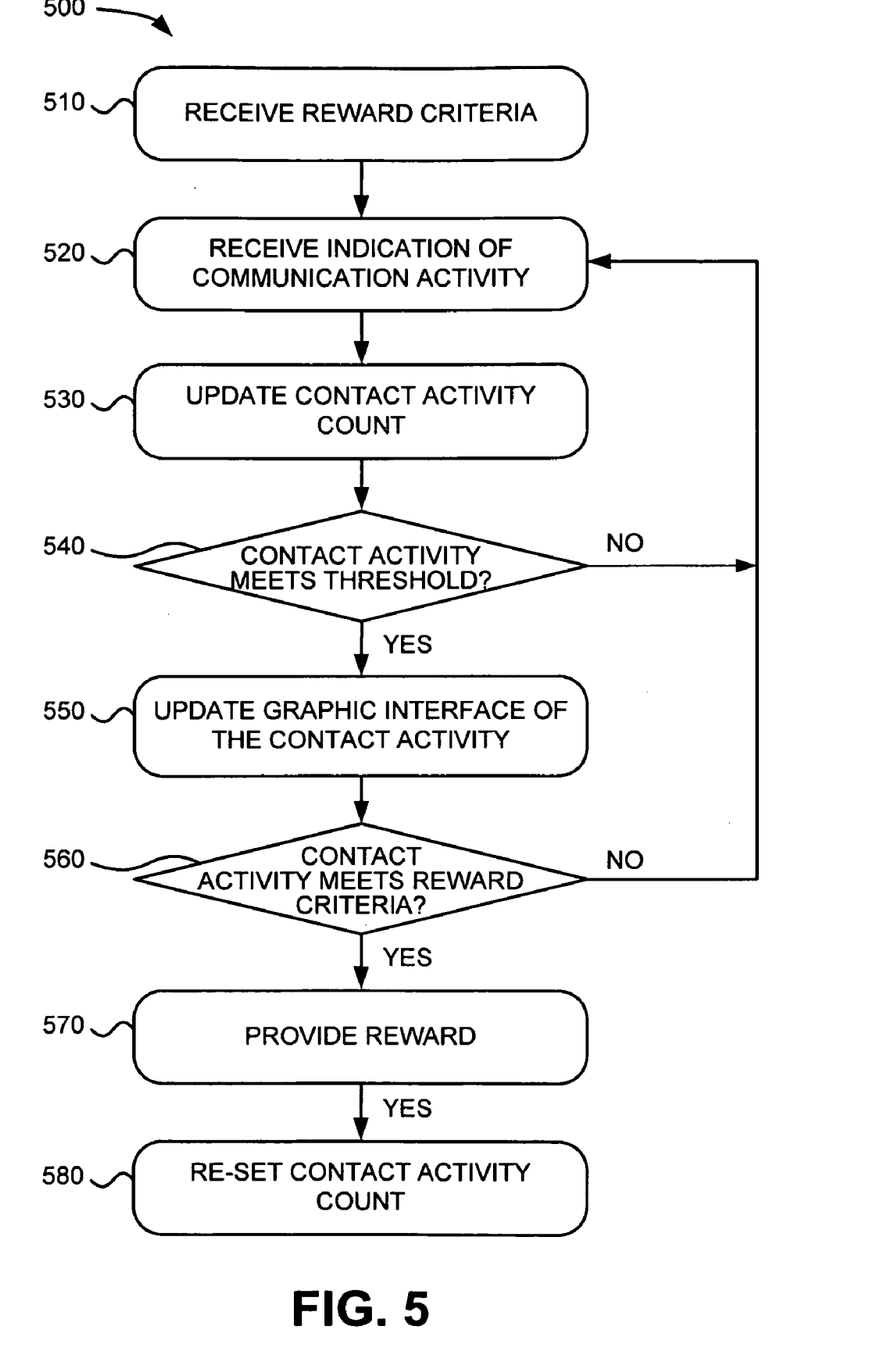
FIG. 5 is a flow chart of an exemplary process performed by a user device.

FIG. 5 depicts a flow chart of an exemplary process 500 performed by a user device according to implementations described herein. In one implementation, process 500 may be performed by hardware or a combination of hardware and software components of user device 100 (e.g., display 220, processor 300, etc.). In other implementations, some or all of process 500 may be performed by hardware or a combination of hardware and software components of user device 100 in combination with hardware or a combination of hardware and software components of another device (e.g., a communications server communicating with user device 100 via communication interface 330).

As illustrated in FIG. 5, process 500 may begin with receipt of reward criteria (block 510). For example, user device 100 may receive reward criteria for a number and/or duration of communications required to receive a reward. Reward criteria may include multiple communication scenarios, such as sent communications only, received communications only, and a combination of sent and received communications. Reward criteria may also include communications objectives for only particular types of communications (e.g., text messages) or a combination of types or communications (e.g., email, text messages, and phone calls). Reward criteria may include communications objectives associated with individual contacts (e.g., a particular contact) or groups of contacts (e.g., family members, designated subscribers, total communications counts for all contacts, etc.). Reward criteria may be included, for example, in software provided by the original equipment manufacturer (OEM) or as downloaded information from another device (e.g., a device communicating with user device 100 via communication interface 330).

An indication of communication activity may be received (block 520). For example, contact manager 410 of user device 100 may receive an indication of communication activity from a communication application (e.g., an email application, phone application, instant message application, etc.). The indication of communication may include, for example, the sender of the communication, the recipient of the communication, the duration of the communication, and/or the type or application of the communication. For example, if a user sends a text message to a mobile directory number (MDN) associated with a contact, "Bob," then contact manager 410 may receive an indication of a text message sent from the user to "Bob."

The contact activity count may be updated (block 530). For example, contact activity tracker 420 of user device 100 may receive an indication that a communication has been sent to/received from a particular contact and may update a record for that contact. In the example of the text message sent to "Bob" above, contact activity tracker 420 may increase, by one increment, the count total of communications associated with "Bob." If, for example, the revised contact activity count applies to a contact that has reached a threshold level of activity, the revised contact activity count may be provided to game interface controller 430 and/or contact manager 410.

It may be determined if the updated activity count meets a threshold (block 540). For example, contact activity tracker 420 may determine if the updated contact activity count reaches a threshold level to require further activity. In the example of the text message sent to "Bob" described above, contact activity tracker 420 may determine that the updated contact activity count for "Bob" is above a particular threshold level of activity to register a contact identifier (e.g., one of contact identifiers 130) for "Bob" on a game screen (such as contact activity pattern screen 110) of user device 100.

If it is determined that the updated activity count does not meet the threshold (block 540—NO), process 500 may return to block 520 to receive an indication of additional communication activity. If it is determined that the updated activity count meets the threshold (block 540—YES), a graphic interface of the contact activity may be updated (block 550). For example, game interface controller 430 of user device 100 may identify particular images to be displayed based on the updated contact activity count received from contact activity tracker 420. In the example of the text message sent to "Bob" described above, game interface controller 430 may adjust the display of the contact identifier 130 associated with "Bob," which may include adding a new contact identifier 130 associated with "Bob" or incrementally adjusting the position of the contact identifier 130 associated with "Bob" in relation to one of zones 120 on contact activity pattern screen 110.

The graphic interface of the contact activity may be shown/hidden upon a command from a user. In an exemplary implementation, contact activity pattern screen 110 may be displayed when a user presses one of command buttons 230 while using a contacts application (e.g., a phone book) for user device 100. In other implementations, contact activity pattern screen 110 may be activated by a selection from a menu-based list of commands.

It may be determined if the contact activity meets the reward criteria (block 560). For example, user device 100 (e.g., contact manager 410 and/or contact activity tracker 420) may determine if the updated contact activity count brings the total communications for that contact within one or more reward criteria. If it is determined that the contact activity does not meet the reward criteria (block 560—NO), process 500 may return to block 520 to receive an indication of additional communication activity.

If it is determined that the contact activity meets the reward criteria (block 560—YES), a reward may be provided. For example, user device 100 may provide a reward to the user in the form of a key to unlock a feature of user device 100, such as a particular 'skin' or user interface environment. Other rewards may include, for example, free services (e.g., a block of usage minutes with a subscription communications service); an access code for multimedia content (e.g., a free MP3 song or a video clip); and coupons for third-party vendors (e.g., a link to a coupon for a book shop, a coffee vendor, an electronics store, etc.). In some implementations, reward items may already be stored on user device 100 and simply unlocked. In other implementations, rewards may be provided to a user via downloads to user device 100, accessed through a separate web site, or provided to a user via a tangible mail system.

The contact activity count may be reset (block 580). For example, user device 100 (e.g., contact activity tracker 420) may clear the contact activity count value for one or more contacts so that future communications with those one or more contacts may be applied to a new set of reward criteria. Resetting the contact activity count may be an optional step. In other implementations, the reward criteria may be configured so that different contacts must be used to earn other rewards.

Exemplary Display Interface

Figure 6A:
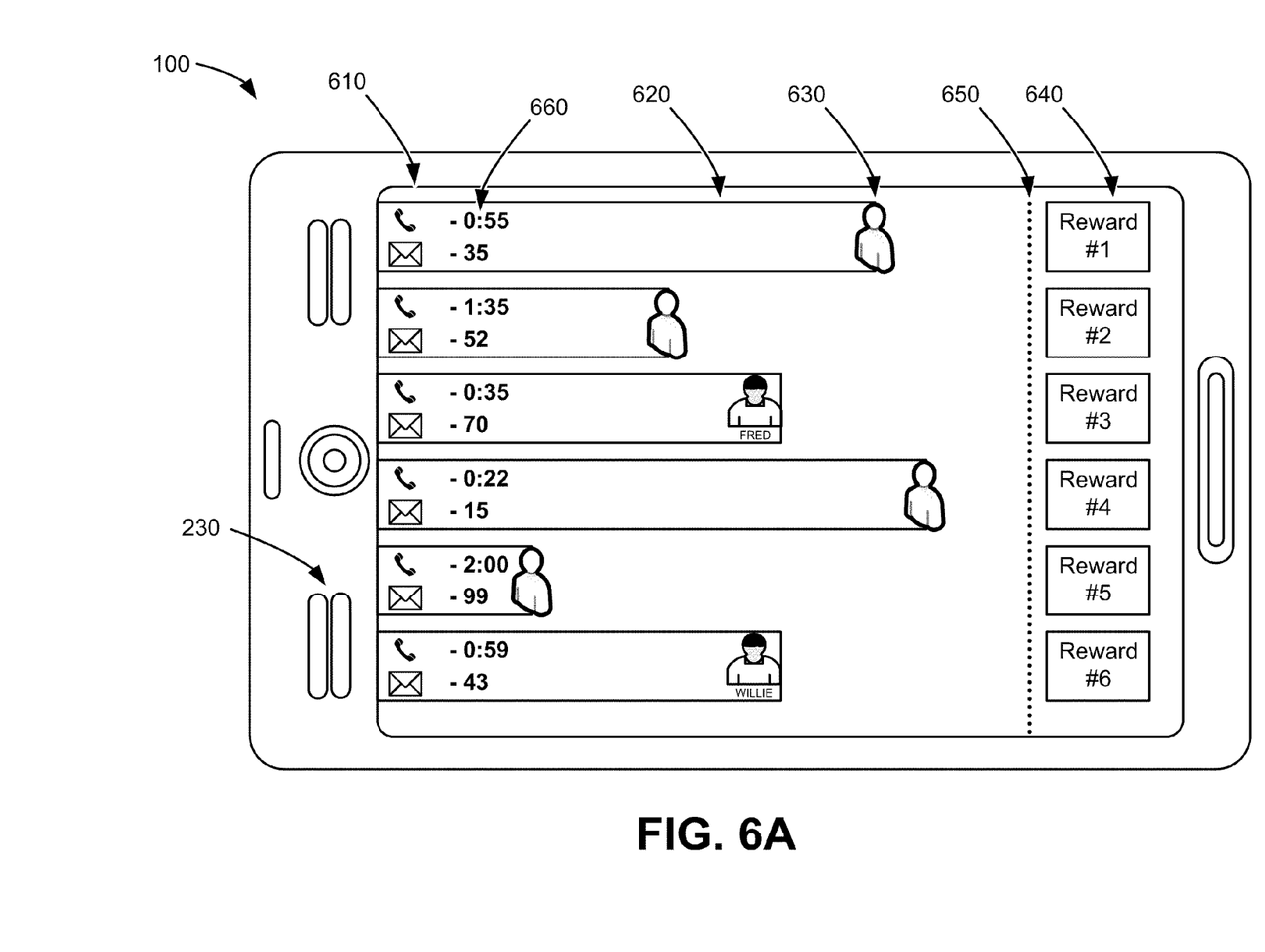
FIGS. 6A and 6B are diagrams illustrating a display of a contact activity pattern screen according to an exemplary implementation.
Figure 6B:
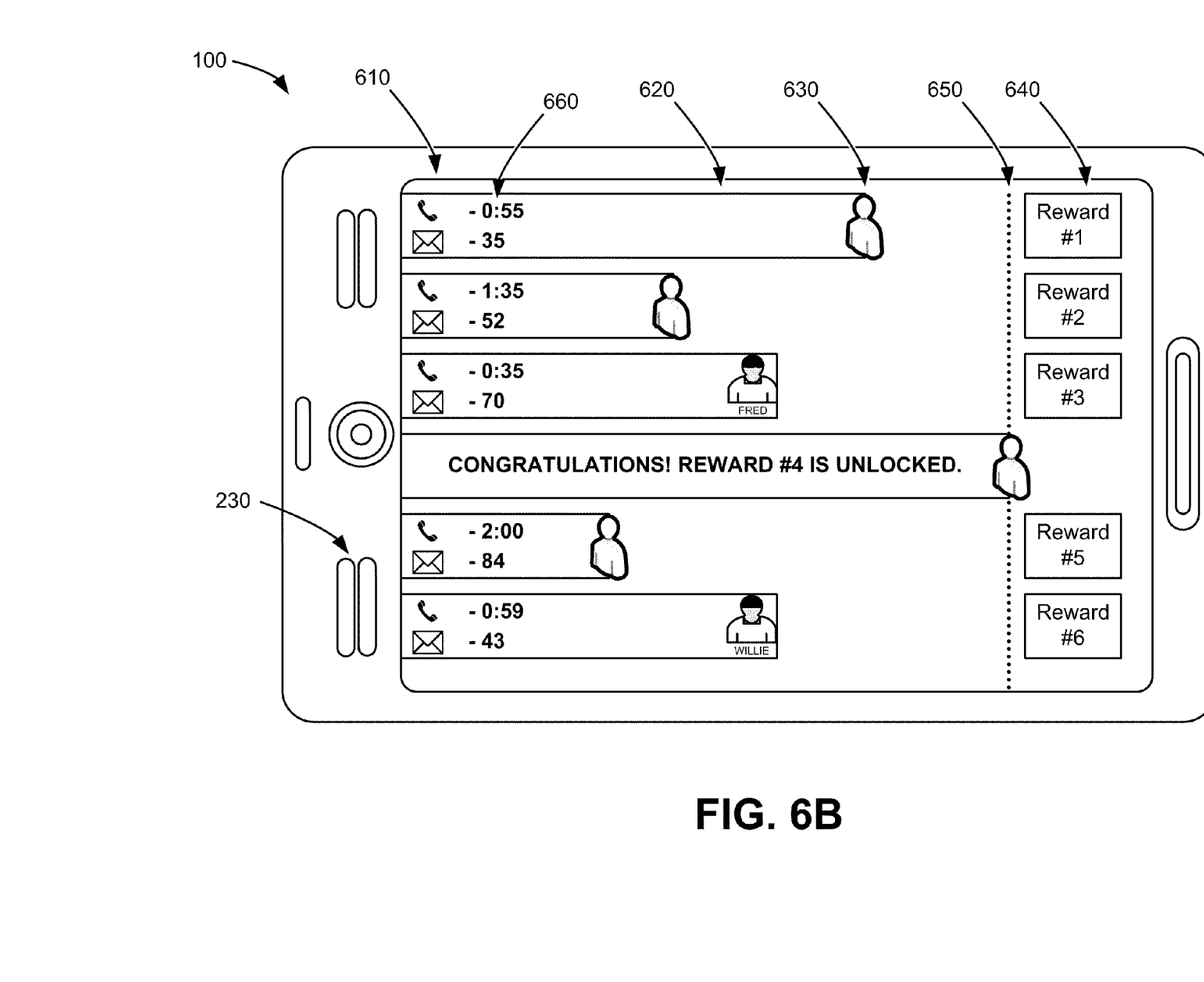

FIGS. 6A and B are diagrams of an exemplary device (e.g., user device 100) displaying contact activity pattern screens according to another implementation. A user may initiate display of contact activity pattern screen 610, for example, by pressing one of control buttons 230 while using a contacts application on user device 100.

Contact activity pattern screen 610 may include communication bars 620 that may be used to indicate communication frequency with particular contacts. Communication bars 620 may include contacts identifiers 630 that associate particular contacts with particular communication bars 620. Contacts identifiers 630 may be represented as graphic images (e.g., pictures associated with the contacts) and/or text describing the contacts.

Once a certain threshold level of communications have occurred with a particular contact, a communication bar 620 associated with a contact identifier 630 representing the particular contact may appear on contact activity pattern screen 610. In the example of FIGS. 6A and 6B, a reward, indicated by reward indicators 640, may be associated with each communication bar 620. Thus, six communication bars 620 and six reward indicators 640 are shown. Each of reward indicators 640 may include text and/or images to indicate a particular reward or a generic reward indication.

Referring to FIG. 6A, as communications continue with a particular contact, the communication bar 620 associated with the particular contact may progress from a beginning point (e.g., the position of the communication bar associated with the reward indicator "Reward #5") toward a target line 650. Target line 650 may illustrate a communications objective (e.g., one-hundred text messages or two hours of talking time within a certain time period) that results in a designated reward when achieved. In one implementation, communication bars 620 may also include textual information 660 that indicates what additional communications remain on a particular communications bar 620 to achieve a reward. For example, for the communication bar 620 associated with the reward indicator Reward #1, textual information 660 may include an indication "55" minutes of talk time and/or "35" messages are required before communications with that particular contact will be rewarded.

Referring to FIG. 6B, when a user completes enough communications with a particular contact to achieve a reward, communication bar 620 may display an indication that the reward has been achieved. For example, for the communication bar 620 associated with the reward indicator Reward #4, textual information 660 may include an indication that Reward #4 (which may be described more particularly with text or an image included within the communication bar 620) has been achieved (e.g., "unlocked").

Although FIGS. 6A and 6B show exemplary arrangements of contact activity pattern screen 610 on user device 100, in other implementations, contact activity pattern screen 610 may contain fewer, additional, different, or differently arranged information than depicted in FIGS. 6A and 6B.

CONCLUSION

Systems and/or methods described herein may use a device that includes a display and a communication application. A reward criterion may be provided for communication activities using the communication application. When communication activity occurs, an indication of the communication activity may be recorded with a cumulative total of communication activities. If the cumulative total of communication activities reaches an initial threshold, a graphic representation of the cumulative total of communication activities may be presented on a display. The cumulative total of communication activities may be presented in relation to the reward criterion, and a reward may be provided to the user upon meeting the criterion.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 5, the order of the blocks may be modified in other implementations. Further, non-dependent blocks may be performed in parallel.

As another example, while implementations have been described primarily in the context a conventional display and control button interface, other user interface techniques may be used to implement live preview of open application windows. For example, a touch interface, keypad commands, or mouse commands may be used to present and/or manipulate a contact activity pattern screen.

It should be emphasized that the term "comprises" and/or "comprising," when used in the this specification, is taken to specify the presence of stated features, integers, steps or components but does not preclude the presence or addition of one or more other features, integers, steps, components or groups thereof.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a user device that includes a display and at least one communication application, the method comprising:
    identifying, via the user device, a reward criterion for communication activities that use the at least one communication application;
    receiving, by the user device, an indication of a communication activity;
    recording, in the user device, the indication of the communication activity with a cumulative total of communication activities; and
    presenting, on the display, a graphic representation of the cumulative total of communication activities, where the cumulative total of communication activities is presented in relation to the reward criterion.

2. The method of claim 1, further comprising:
    providing a reward to a user if the cumulative total of communication activities meets the reward criterion.

3. The method of claim 2, where the reward includes one of:
    unlocking a feature of the user device;
    free services from a subscription communications service;
    access to free multimedia content; or
    a coupon for third-party vendors.

4. The method of claim 1, where the indication of a communication activity includes a communication activity with a particular contact, and where the cumulative total of communication activities includes a cumulative total of communication activities for the particular contact.

5. The method of claim 4, further comprising:
    obtaining a threshold criterion for presenting the graphic representation of the cumulative total of communication activities for the particular contact; and
    determining that the cumulative total of communication activities for the particular contact meets the threshold level.

6. The method of claim 1, where the reward criterion is based on a particular number of communication activities within a particular time period.

7. The method of claim 1, where the reward criterion is based on a particular duration of communication activities within a particular time period.

8. The method of claim 1, where the communication activity includes sending or receiving, by the user device, one or more of:
    an email;
    a text message;
    a telephone call; or
    an instant message.

9. The method of claim 1, where the communication activity includes one of:
    communications received by the user device; or
    communications sent from the user device.

10. A device, comprising:
    a communications interface;
    a display; and
    a processor to:
        send and receive communications using the communications interface;
        obtain indications of the communications;
        record the indications of the communications based on a contact associated with each of the communications; and
        present, on the display, a graphic representation of a cumulative total of communications associated with the contact, where the cumulative total of communications is presented in relation to a reward criterion.

11. The device of claim 10, further comprising:
a memory to store the recorded indications of communications based on a contact associated with each of the communications.

12. The device of claim 10, where the processor is further configured to:
provide access to a reward if the cumulative total of communications meets the reward criterion.

13. The device of claim 12, where the reward is associated with the reward criterion and includes:
unlocking a feature of the device.

14. The device of claim 10, where each of the indications of communications includes a communication with a particular contact and a type of communication application associated with the communication.

15. The device of claim 14, where the graphic representation of the cumulative total of communications associated with the contact includes the types of communications associated with the contact.

16. The device of claim 10, where the processor is further configured to:
determine that the cumulative total of communications associated with the contact meets a threshold criterion for presenting communications associated with the contact on the graphic representation.

17. The device of claim 10, where the reward criterion is based on one of:
a particular number of communication activities within a particular time period, or
a particular duration of communication activities within a particular time period.

18. The device of claim 10, where the communications include sending or receiving, by the device, one or more of:
email;
text messages;
telephone calls; or
instant messages.

19. A method performed by a user device that includes a display and a plurality of communication applications, the method comprising:
identifying, via the user device, a reward criterion for conducting communications using the communication applications;
recording, in the user device, indications of communications, where each of the indications includes one of a group of particular contacts associated with a communication and a type of communication application associated with the communication;
identifying, via the user device, a threshold criterion for presenting, on the display, a graphic representation of a cumulative total of communications associated with one of the particular contacts; and
presenting, on the display, a graphic representation of the cumulative total of communications associated with the one of the particular contact, where the cumulative total of communications is presented in relation to the reward criterion.

20. The method of claim 19, further comprising:
providing a reward to the user of the user device if the cumulative total of communications meets the reward criterion.

* * * * *